May 15, 1928. 1,670,207
L. MURPHY
APPARATUS FOR INDICATING THE DEPTH OF LIQUIDS
Filed July 6, 1923
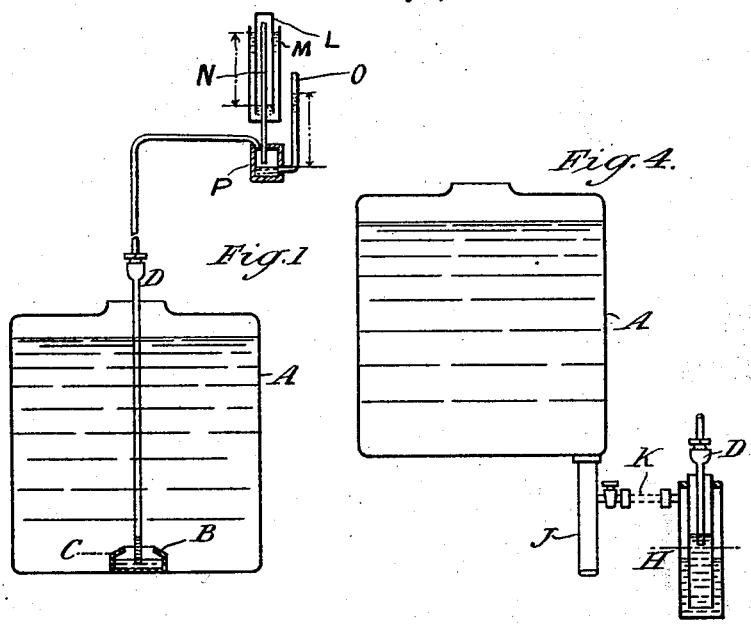
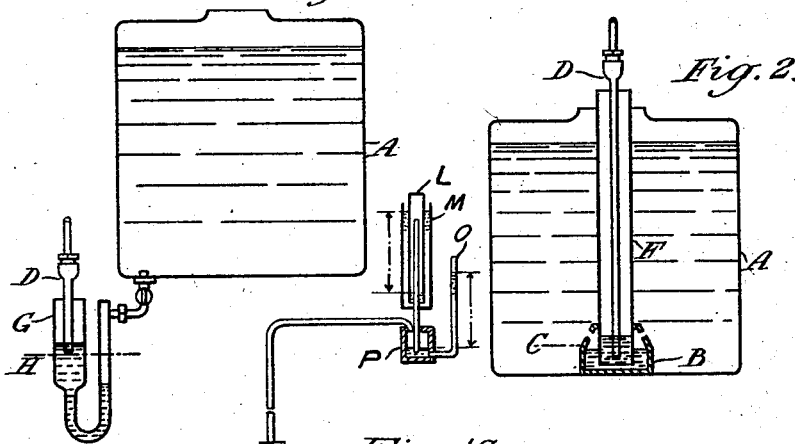
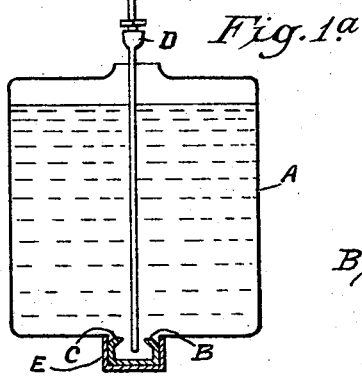

Patented May 15, 1928.

1,670,207

UNITED STATES PATENT OFFICE.

LEONARD MURPHY, OF DUBLIN, IRELAND.

APPARATUS FOR INDICATING THE DEPTH OF LIQUIDS.

Application filed July 6, 1923. Serial No. 649,885, and in Great Britain October 19, 1922.

The invention relates to apparatus of the kind described, for example, in my U. S. Patent No. 1,294,939, for indicating the depth of liquid in a vessel, reservoir, river or the like. In this known apparatus air or other gas is forced to escape through the open end of a pipe extending to the lowest level of the liquid, the pressure exerted on the gaseous medium being measured by a barometric column of mercury or other liquid or by a pressure gauge of for example, the Bourdon type.

It has been found that the immersed end of the tube in the liquid is liable to become choked, and in the case of viscous liquids, such as fuel oil, a pipe of large bore has to be used which delays the production of an accurate reading. Also in the case of fuel oil stored in ship tanks there is a tendency to blow oil up the tube if steam pressure is applied to assist in emptying the tanks. The invention is designed to obviate these and other drawbacks.

In my British Patent No. 2,211 of 1900 I have described a depth indicator in which a mercury seal was placed in a vessel enclosed in a closed bulb surrounding the air pipe near its lower end, but according to the present invention the sealing liquid, such as mercury, is contained in a vessel open to the liquid and placed at the bottom of the tank containing the liquid of which the depth is required.

The sealing liquid also rises in the tube if steam pressure is applied to the tank and prevents oil or other liquid from entering the tube.

The invention will be described with reference to the accompanying drawing, in which:—

Fig. 1 is a vertical sectional view of one embodiment of the invention,

Fig. 1ª is a view similar to Fig. 1 of a modified form of the embodiment of the invention shown in Fig. 1, and Figs. 2, 3 and 4 are views similar to Fig. 1 of other embodiments of the invention.

In the embodiment of the invention shown in Fig. 1 on the bottom of the tank A is placed an open cup B containing a suitable sealing liquid, such as mercury, and filled originally to a level C. In this cup the lower open end of a tube D terminates beneath the surface of the sealing liquid. A suitable means for forcing air through the tube D and a pressure gauge or the like are attached to the other end of said tube. In the present instance, the tube D is connected to the upper portion of a closed chamber P containing a sealing medium, such as mercury, and a tube N is shown as also extending through the top of the chamber P. The tube N extends through the bottom of a tube M which contains a suitable sealing liquid, such as mercury, and has its upper end terminating near the upper end of the tube M. A tube L having its upper end closed and its lower end immersed in the sealing liquid in the tube M, when lowered in the tube M, generates air pressure in the chamber P and in the tube D. A tube O extends laterally and upwardly from the lower portion of the chamber P and has its upper end open to the atmosphere. When the tube L is lowered in the tube M air is forced through the tube N, the chamber P and the tube D and thence through the sealing liquid in the cup B. The sealing liquid in the chamber P is thus caused to rise slightly in the tube O and show the pressure due to the level of the mercury in the cup—this point is now marked as the zero or empty mark of the tank, neglecting the small depth of liquid as far as the lip of the cup, though this may be provided for by recessing the bottom of the tank as shown at E in Fig. 1ª and placing the cup in this recess with the lip of the cup level with the bottom of the tank.

Liquid is now poured into the tank and as it rises enters the cup and forces the sealing liquid to rise in the tube D, the sealing liquid absolutely preventing the entry into the tube of any of the liquid which is being measured. On the other hand, the air blown through the fine tube D bubbles freely through the sealing liquid and escapes through the liquid in the tank causing the indicating column or pressure gauge to rise and show the exact depth or pressure of liquid in the tank in excess of the depth of sealing liquid in the sealing cup B.

It will also be obvious that pilfering the liquid in the tank A by suction through the pipe D is impossible, even if a perfect vacuum were obtained by suction, provided the length of the pipe exceeds by 31 inches the height of the highest point reached by the sealing liquid in the pipe when the tank is full.

The arrangement has the advantage of preventing the formation of ice in the pipe D, as no liquid other than the sealing liquid can enter it.

In the modified form of the apparatus shown in Fig. 2 one end of a large bore tube F open at both ends rests almost on the bottom of the cup B and its upper end is above the highest point reached by the liquid in the tank A. The pipe D is introduced within the tube F and its open end is arranged to be just below the level of the sealing liquid in the cup when the tank is empty.

This arrangement has the advantage of not allowing any air to blow or bubble through the liquid in the tank, as the sealing liquid in the cup B also seals the end of the pipe F; consequently, though sealing liquid can rise freely in the pipe F, as the height of the liquid in the tank increases, no liquid from the tank can enter the pipe F. The air blown through the pipe D bubbles through the sealing liquid in pipe F and escapes through the open end of the latter pipe without passing through the liquid in the tank; the rise of the sealing liquid in the pipe F will be proportional to the height and specific gravity of the liquid in the tank and the pressure indicated by the gauge will be the difference between the level of the sealing liquid in pipe F and in the open end of the pipe D.

The smaller the bore of pipe F relatively to the inside diameter of the cup B, the higher the sealing liquid will rise in this pipe for a given depth of liquid in the tank, hence the relative diameters of the cup B and of the bore of the tube F will regulate the height to which the sealing liquid will rise in this tube under the pressure exerted by the liquid in the tank; this has the advantage of allowing a depth indicator of comparatively short column or a low pressure gauge to show the liquid contents of a very deep tank.

The gauges can be marked empirically by filling the tank to known levels, or, alternatively, the scales can be graduated from the known dimensions of the tubes.

Fig. 3 shows a further embodiment of the invention. In this construction a U tube G is attached beneath the tank as shown and filled with sealing liquid, such as mercury, to a level H. One of the legs of the U tube is connected to the liquid in the tank and the other leg is open to the atmosphere. In the open end of the tube G the pipe D is fixed so that its open end is either beneath the surface of the sealing liquid at H, or preferably just touches the normal surface of the sealing liquid when the tank is drained of liquid, which surface will, owing to the pressure of the liquid in the connecting pipe, be slightly above the level H and this level will be constant for each apparatus when attached.

When the tank is filled with liquid the sealing liquid will fall in the leg of the tube G which is connected to the tank and rise in the other leg of said tube, thus immersing the end of pipe D more or less according to the depth and gravity of the liquid in the tank. On blowing air through the pipe D an exact indication of the depth of liquid in the tank will be shown on the pressure gauge.

The relative bores of the two legs of the U tube G will regulate the rise of sealing liquid in the open leg of the tube for the reasons mentioned with respect to the apparatus shown in Fig. 2 and enable, if desired, a low pressure gauge or shorter column indicating apparatus to be used with accuracy.

Fig. 4 shows an alternative construction of the U tube shown in Fig. 3. In this construction one leg of the tube is placed within the other and the tube is shown connected by a branch pipe K to a discharge pipe J and may consequently be placed at a considerable distance from the tank.

Having thus described the nature of the said invention and the best means I know of carrying the same into practical effect, I claim:—

1. A device for indicating the depth of a liquid in a receptacle, comprising a vessel to contain a sealing liquid, said vessel being open at its upper end and in communication with the interior of said receptacle near the base of the latter, the sealing liquid contained in said vessel being exposed to the pressure of the liquid in the receptacle, a tube through which air may be blown extending into said vessel and of which the lower end is immersed in and sealed by the sealing liquid contained in said vessel, means associated with said tube for indicating air pressure therein, and a second tube, open to the atmosphere at its upper end, surrounding the first mentioned tube and having its lower end sealed by the sealing liquid in said vessel.

2. A device for indicating the depth of a liquid in a receptacle, comprising a vessel to contain a sealing liquid, said vessel being open at its upper end and adapted to be placed within and at the bottom of said receptacle, the sealing liquid contained in said vessel being exposed to the pressure of the liquid in the receptacle, a tube through which air may be blown, and of which the lower end is immersed in and sealed by said sealing liquid, means associated with said tube for indicating air pressure therein, and a second tube, open to the atmosphere at its upper end, surrounding the first mentioned tube and having its lower end sealed by the sealing liquid in said vessel.

In testimony whereof I have signed my name to this specification.

LEONARD MURPHY.